United States Patent

[11] 3,627,418

[72] Inventors Stephen Prigozy; Herman Post, both of Great Neck, N.Y.

[21] Appl. No. 18,193
[22] Filed Mar. 10, 1970
[45] Patented Dec. 14, 1971
[73] Assignee Robins Industries Corp. Flushing, N.Y.

[54] CASSETTE TAPE SYSTEM WITH STROBOSCOPIC TEST MEANS
9 Claims, 6 Drawing Figs.

[52] U.S. Cl. .................................................. 356/23, 274/1, 274/4, 274/11, 356/25
[51] Int. Cl. .................................................. G01b 3/40, G11b 5/00
[50] Field of Search .................................................. 356/23–26; 274/1 K, 4 B, 4 C, 4 D, 4 R, 11, 11 R, 11 B, 11 C, 11 D, 11 E

[56] References Cited

UNITED STATES PATENTS 2,567,086 9/1951 Stoltz .......................... 356/25 X
2,604,321 7/1952 Williams .......................... 274/4 UX

OTHER REFERENCES

Snel: Magnetic Sound Recording, Philips' Technical Library, 1959, pp. 156–158

*Primary Examiner*—Ronald L. Wibert
*Assistant Examiner*—F. L. Evans
*Attorney*—Michael S. Striker

ABSTRACT: A cassette tape recorder and reproducer is adapted for use with tape cassettes with predetermined dimensions and configurations and has a rotatable tape transport shaft for transporting tape at a predetermined rate. Stroboscopic test means is provided for testing for deviations from the predetermined rate and has a cassette-casing means corresponding to the predetermined dimensions and configuration, a rotatable hub in the casing means engageable with the tape transport shaft, an observation window in the casing for observing at least a portion of the interior thereof, a stroboscopic tape trained in a close loop about the hub for advancement lengthwise of itself in response to rotation of the hub, guide means guiding the tape in a predetermined path past the window, and a light source means illuminating the tape with a periodicity requisite for making the tape appear to be at a standstill when the shaft transports the tape at a predetermined rate.

INVENTOR
STEPHEN PRIGOZY
HERMAN POST
BY
ATTORNEY

INVENTOR
STEPHEN PRICOLO
HERMAN POST
BY Michael S. Striker
ATTORNEY

INVENTOR
STEPHEN PRIGOZY
NORMAN POST
BY
ATTORNEY

CASSETTE TAPE SYSTEM WITH STROBOSCOPIC TEST MEANS

BACKGROUND OF THE INVENTION

The present invention relates generally to cassette tape systems, and more particularly to a cassette tape system including stroboscopic test means for testing for deviations from the predetermined advancement rate of the recording and/or reproducing tape.

There is currently a constantly increasing emphasis on the use of so-called cassette tape recorders and reproducers. These machines, contrary to the well-known reel-to-reel type tape recorders, utilize magnetic recording tape which is enclosed in a casing of small dimensions, a so-called "cassette." The cassette has two rotatable hubs and the tape is convoluted about these hubs and moves from one to the other as the tape is being recorded or reproduced, or as the tape is being rewound. There is no need for threading of the tape and in fact the user never touches the tape at all. The casing is provided with cutouts through which the tape comes into contact with the recording and reproducing heads of the cassette tape recorders and reproducers with which these particular tapes are designed to be used.

These cassette tape recorders or reproducers are machines which are usually of rather small dimensions and which comprise a very limited space which accommodates precisely a tape cassette. Because the tape cassettes are small and therefore can accommodate only a relatively small tape footage, the tape advancement speed which has been selected from the tape in these cassettes is 1⅞ inches per second. Naturally, deviations from this speed cause serious distortions in the sound fidelity, whether it be recorded or reproduced. Regardless of whether the deviations are upwardly or downwardly of the predetermined speed, that is regardless of whether the tape advances at a faster or a slower rate than 1⅞ inches per second. To avoid this it is necessary to provide for testing means.

Testing means for testing the rate of tape transport are already known in reel-to-reel type recorders. They are based on the stroboscopic principle which comprise a tape which is longitudinally subdivided into alternating light and dark areas and a flashing light which illuminates the tape as it moves from one to the other reel. If the rate of advancement of the tape and the flashing of the light are not quite synchronized, then the tape appears to move slowly in one direction of the other depending upon whether the tape speed is higher or lower than intended—and assuming that the flash cycle of the light is constant and takes place at the speed intended for it. This is a ready means of identifying whether the tape speed of the tape recorder/reproducer is the proper intended speed, whether the tape transport is fast or whether it is slow.

However, heretofore it has not been possible to utilize this principle in determining the question whether tape transport in a cassette-type recorder/reproducer plays properly or deviates from the intended value. On the other hand, this determination is equally as important for these machines as it is for reel-to-reel type recorders.

SUMMARY OF THE INVENTION

It is, accordingly, an object of the present invention to provide a tape cassette system which permits this determination.

More particularly it is an object of the present invention to provide such a cassette tape system which permits the use of stroboscopic test means.

It is emphasized that the term cassette recorder/reproducer or player as herein used refers to the well-known type of apparatus utilizing for tape-recording and/or reproducing purposes a magnetic tape accommodated in an enclosed casing known as a "cassette."

In pursuance of the above objects, and others which will become apparent hereafter, one feature of the invention resides, briefly stated, in a cassette tape recorder and reproducer means adapted for use with tape cassettes of predetermined dimensions and configurations, and having a rotatable tape transport shaft for transporting tape at a predetermined rate. Stroboscopic test means is provided for testing for deviations from this predetermined rate; it comprises cassette casing means corresponding to the aforementioned predetermined dimensions and configuration, a rotatable hub in the casing means engageable with the tape transport shaft for rotation by the same, an observation window in the casing for observing at least a portion of the interior of the same, a stroboscopic tape trained in a close loop about the hub lengthwise of itself in response to rotation of the hub, guide means guiding the tape in a predetermined path and past the window, and light source means illuminating the tape with a periodicity requisite for making the tape appear to be at a standstill when the shaft transports the tape at the predetermined rate.

As mentioned above, the stroboscopic principle is well known and it is therefore not thought that it requires a more detailed explanation than that which has already been given. Heretofore it has not been employed and has not been capable of employment in an arrangement of the type here under discussion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
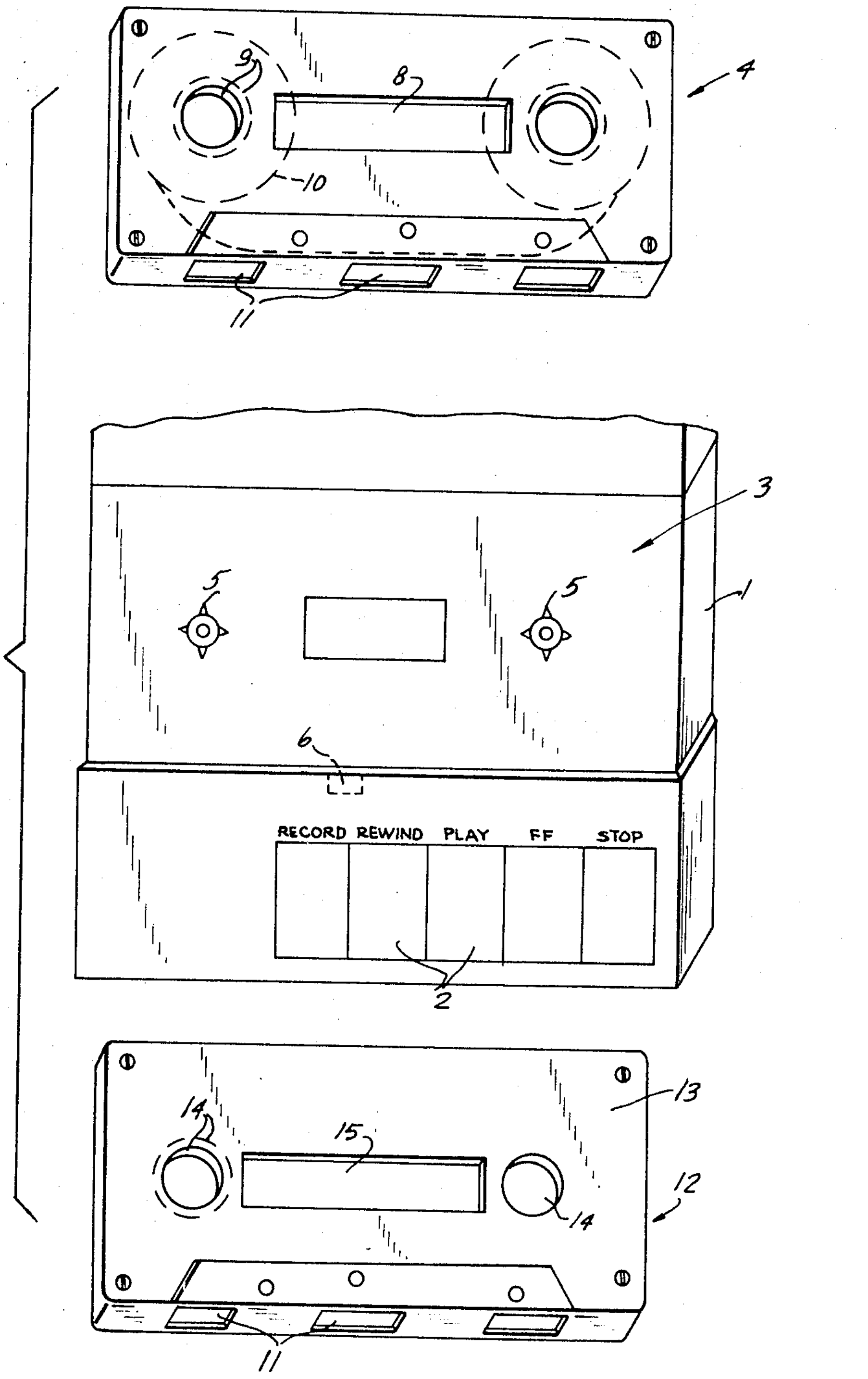
FIG. 1 is a fragmentary diagrammatic top plan view illustrating the components of the arrangement herein described.

Discussing now the drawing in detail it will be seen that reference numeral 1 generally identifies a tape recorder/reproducer of the cassette type. In other words, this is one of the well-known machines available on the market in great variety which utilize a cassette tape, that is a tape which is completely enclosed in a casing known as a tape cassette. Reference numeral 2 identifies a plurality of pushbutton controls whose functions are indicated with legends in FIG. 1. Of course, machines of the type here in question sometimes have not pushbutton controls but other controls, and for purposes of the present invention the particular type of function control is entirely irrelevant. All such machines have a space for accommodating a tape cassette, and in FIG. 1 this space is identified with reference numeral 3. Reference numeral 4 identifies a diagrammatically illustrated tape cassette which can be accommodated in the space 3 of the apparatus 1. Reference numeral 6 is a tape head, of which several may be provided, for recording and/or reproducing of signals on a tape in the cassette 4. Reference numeral 5 identifies rotatable shafts extending out of the machine into the space 3 and engageable with hubs 9 provided in the cassette 4 which are rotated when the shafts are rotated. Reference numeral 10 identifies a magnetic tape which is secured to and convoluted about the hubs 9 so as to move from one onto the other as the hubs 9 are rotated by the shafts 5. Reference numeral 8 identifies a window affording a view of the interior of the tape cassette 4 so that the user may see how much tape remains on the payoff hub, that is how much tape remains still to be recorded. The tape is identified with reference numeral 10 and it will be seen that it moves from one hub 9 onto the other. Reference numeral 11 identifies cutouts in an edge face of the cassette 4 through which the head or heads 6 can come in contact with the tape 10.

Also in FIG. 1 there is illustrated stroboscopic test means 12 comprising a casing 13 identical with that of the cassette 4. In fact, such casings are mass produced in great numbers, and for the sake of economy it is simply possible to use the type of casing employed in the cassettes 4 for the casing 13 of the test means 12. Reference numeral 14 identifies the hubs, but one of the rotatable annuli is identified with reference numeral 9 with respect to the cassette 4 is here omitted, because only one (also identified with reference numeral 14 and shown in broken lines) is required for the device 12. Reference numeral 15 identifies an observation window corresponding to the observation window 8, and in fact identical therewith if the casing 13 is of the same identical type as used for the cassette 4.

Figure 2:
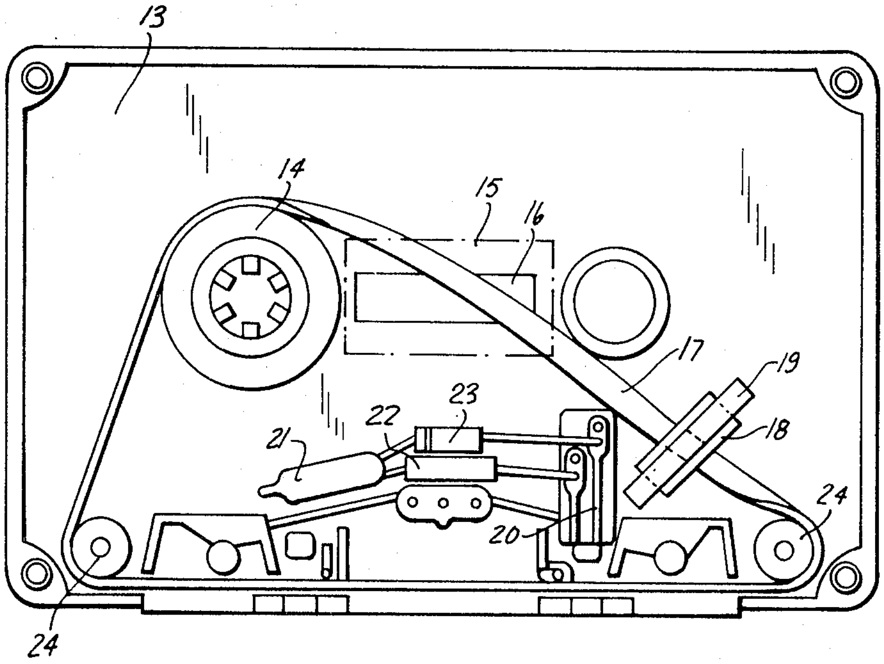
FIG. 2 is a top plan view of a stroboscopic test device according to the present invention, with the cover of the casing thereof removed for clarity.

FIG. 2 shows details of the construction of the device 12, and in this FIGURE the top of the casing 13 has been removed for ready viewing. Reference numeral 16 here identifies a strip of contrasting or reflecting material which may be placed inside the casing below the observation window 15 (which is shown in broken lines) so that tape passing under this observation window and over the material 16 can be more readily viewed. Reference numeral 17 identifies a closed loop of stroboscopic tape which is trained about the one rotatable hub 14 and also about a pair of rollers 24. Reference numeral 18 is a friction gasket, that is of friction-producing material which lightly overlies the tape 17 as illustrated, and which is held in place by means of a piece of adhesive tape securing it to the casing 13. It is emphasized that the adhesive tape must not come in contact with the stroboscopic tape 17. Otherwise advancement of the tape 17 would be prevented or retarded.

Reference numeral 20 identifies a flexible electrical conductor reference numeral 21 a neon bulb, reference numeral 22 a resistor and reference numeral 23 a diode. These are connected in the illustrated manner so that the diode is connected in parallelism with the resistor 22.

Figure 3:
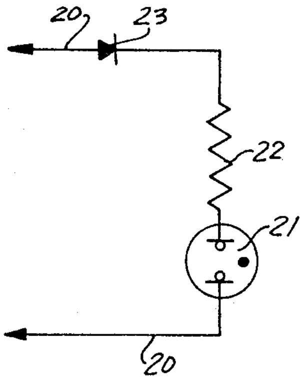
FIG. 3 is a circuit diagram of the test device shown in FIG. 2.

FIG. 3 is a circuit diagram showing the conductor 20 which is connectable to an exterior source of electrical energy, and specifically a source of alternating current, the diode 23, the neon bulb 21 and the resistor 22.

Figure 4:
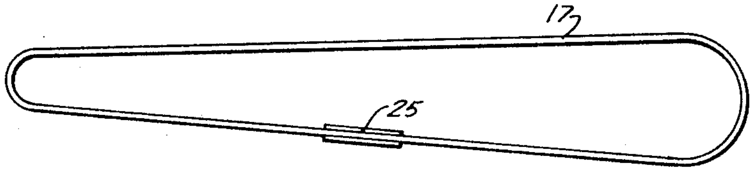
FIG. 4 is a diagrammatic plan view showing a stroboscopic tape loop for use in the disclosed device.
Figure 5:
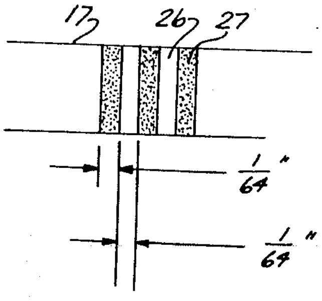
FIG. 5 is a fragmentary detail view, on an enlarged scale, of the stroboscopic tape shown in FIG. 4.

In FIGS. 4 and 5 there have been shown details of the stroboscopic tape 17. It will be seen that it is a loop of tape formed from a length of tape whose ends are connected, for instance as illustrated with pieces of splicing tape 25. One side of the tape 17 is provided, as shown in FIG. 5, with a plurality of alternating light and dark areas 26 and 27, and while only some of these have been shown in FIG. 5 it will be understood that the entire side in question of the tape 17 is covered with then. The dimensions lengthwise of the tape 17 of the light and dark areas are shown in FIG. 5 and will be shown to be 1/64 inch. Corresponds with the rate at which the neon lamp 21 flashes when energized by electrical alternating current.

Figure 6:
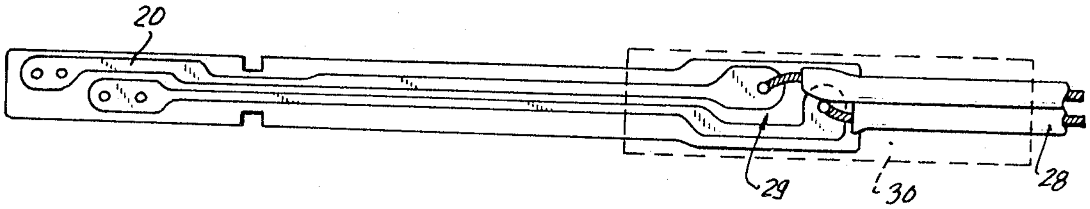
FIG. 6 is a detail view, on an enlarged scale, showing the connection between the power cord and a flexible conductor supplying electric current to the disclosed stroboscopic test device.

Finally, FIG. 6 shows how the flexible conductor 20, which comprises a flexible ribbon of insulating material in which two conductors of electrically conductive material are embedded as illustrated is connected with a line cord 28 with a connector 29, for instance at a soldered joint. To establish insulation over the junction between the conductor 20 and the line cord 28—which latter is connectable with source of alternating current—a length of synthetic plastic tubing of molecularly oriented plastic is slipped over the juncture and then heated, whereby it shrinks into tightly fitting engagement with the conductor 20 and the line cord 28, providing an electrically insulating splice. Such tubing 30 is already well known in the art.

In operation of the herein disclosed arrangement the test means 12 is inserted into the space 3 of the recorder/player 1 and the line cord 28 is connected with a source of alternating current. This energizes the neon bulb 21 which flashes. The recorder/reproducer 1 is now switched to the "play" or the "record" mode at which it is intended to transport the tape cassette 4—and accordingly the stroboscopic tape 17 in the device 12—at a rate of 1⅞ inches per second. If this rate is in fact properly maintained, then the stroboscopic tape 17 will appear to be standing still. If the transport is at too fast or too slow a rate, then the tape will appear to be moving in one or the other direction, depending upon whether the rate is too fast or too slow. Once this has been determined, corrective action can be taken to bring the tape transport speed of the recorder/player 1 up to the intended value.

It will be seen that with the arrangement according to the present invention determination of whether the tape transport speed is accurate or not is very simple, requires no skill at all—which is particularly important for the many amateurs who use this type of machine—and is very accurate and foolproof. Moreover, no large bulky equipment is needed and no more space is required in the machine—and for storage of the testing equipment outside of the machine—than is needed otherwise for the conventional cassette 4 which are accommodated in the machine when a recording is to be made or reproduced.

It will be understood that each of the elements described above, or two or more together, may also find a useful application in other types of constructions differing from the types described above.

While the invention has been illustrated and described as embodied in a cassette tape system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A cassette tape recorder and reproducer means for use with tape cassettes of predetermined dimensions and configuration, and having a rotatable tape transport shaft for transporting tape at a predetermined rate; and stroboscopic test means for testing for deviations from said predetermined rate, said test means comprising cassette casing means corresponding to said predetermined dimensions and configuration, a rotatable hub in said casing means engageable with said tape transport shaft for rotation by the same, an observation window in said casing means for observing at least a portion of the interior of the same, a stroboscopic tape trained in a closed loop about said hub for advancement lengthwise of itself in response to rotation of said hub, guide means guiding said tape in a predetermined path and past said window, and light source means inside said casing means illuminating said tape with a periodicity requisite for making said tape appear to be at a standstill when said shaft transports said tape at said predetermined rate.

2. An arrangement as defined in claim 1, said cassette-casing means consisting at least predominantly of synthetic plastic material.

3. An arrangement as defined in claim 1, said stroboscopic tape having a major surface subdivided lengthwise of said tape into alternate identical lighter and darker areas, and said tape transport shaft rotating at a speed requisite for advancing a predetermined number of said areas past said window in a given unit of time; and wherein said periodicity is double said predetermined number.

4. An arrangement as defined in claim 1, said light source means comprising an electrically energizable light bulb, conductor means including a pair of electrical power supply leads for connection to a source of alternating current, a resistor in circuit with one of said leads and with said light bulb, and a diode in circuit with the other of said leads and with said light bulb.

5. An arrangement as defined in claim 4, wherein said light bulb is a neon bulb.

6. An arrangement as defined in claim 4, said casing means having an opening, and said conductor means extending through said opening to the exterior of said casing and including a flexible ribbon of electrically insulating material embedding said pair of leads therein.

7. An arrangement as defined in claim 1, said guide means comprising a pair of freely rotatable rollers spaced from one another and mounted for rotation in axial parallelism with each other.

8. An arrangement as defined in claim 3, said given unit of time being a second, and said predetermined rate corresponding to transportation of one and seven-eighths of an inch of tape per second; and wherein said areas each have a width of one sixty-fourth of one inch in direction lengthwise of said tape.

9. An arrangement as defined in claim 6, said leads having free end portions located exteriorly of said casing; further comprising a line cord having two conductors each having an end; connecting means conductively connecting each of said free end portions with one of said ends; and a sleeve of synthetic plastic material surrounding said ends, end portions and connecting means and engaging the same tightly with a shrink fit.

* * * * *